(12) United States Patent
Lin et al.

(10) Patent No.: US 8,612,873 B2
(45) Date of Patent: Dec. 17, 2013

(54) METHOD AND APPARATUS FOR OPERATING DISPLAYED AREA OF ELECTRONIC MAP AND RECORDING MEDIUM

(75) Inventors: Bing-Sheng Lin, Taoyuan County (TW); Rubens Chu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 67 days.

(21) Appl. No.: 12/549,335

(22) Filed: Aug. 27, 2009

(65) Prior Publication Data
US 2010/0058225 A1 Mar. 4, 2010

(30) Foreign Application Priority Data
Aug. 29, 2008 (TW) .............................. 97133282 A (51) Int. Cl.
*G06F 3/048* (2013.01)

(52) U.S. Cl.
USPC .......................................... 715/764; 715/864

(58) Field of Classification Search
USPC .................... 715/764, 864; 345/157; 701/208
See application file for complete search history.

(56) References Cited

U.S. PATENT DOCUMENTS

| | | | | |
|---|---|---|---|---|
| 5,270,937 A * | 12/1993 | Link et al. | | 701/446 |
| 5,353,034 A * | 10/1994 | Sato et al. | | 342/457 |
| 5,377,113 A * | 12/1994 | Shibazaki et al. | | 701/428 |
| 6,336,073 B1 * | 1/2002 | Ihara et al. | | 701/202 |
| 6,397,143 B1 * | 5/2002 | Peschke | | 701/432 |
| 6,484,094 B1 * | 11/2002 | Wako | | 701/438 |
| 6,563,529 B1 * | 5/2003 | Jongerius | | 348/36 |
| 6,724,382 B2 * | 4/2004 | Kenyon et al. | | 345/419 |
| 7,075,513 B2 * | 7/2006 | Silfverberg et al. | | 345/157 |
| 7,359,798 B2 * | 4/2008 | Nagamasa | | 701/455 |
| 7,373,244 B2 * | 5/2008 | Kreft | | 701/532 |
| 7,555,725 B2 * | 6/2009 | Abramson et al. | | 715/781 |
| 7,616,217 B2 * | 11/2009 | Dayan et al. | | 345/619 |
| 7,698,062 B1 * | 4/2010 | McMullen et al. | | 701/438 |
| 7,890,257 B2 * | 2/2011 | Fyke et al. | | 701/431 |
| 7,913,192 B2 * | 3/2011 | Dicke et al. | | 715/864 |
| 7,945,852 B1 * | 5/2011 | Pilskalns | | 715/230 |
| 8,014,943 B2 * | 9/2011 | Jakobson | | 701/439 |

(Continued)

FOREIGN PATENT DOCUMENTS

DE 102005020152 11/2006

OTHER PUBLICATIONS

"Search Report of European counterpart application", issued on Nov. 3, 2009, p. 1-p. 4.

(Continued)

*Primary Examiner* — Phenuel Salomon
(74) *Attorney, Agent, or Firm* — Jianq Chyun IP Office (57) ABSTRACT

A method and an apparatus for operating a displayed area of an electronic map and a recording medium are provided. In the method, a displayed area of an electronic map is displayed first. Then, an indicating object of a point of interest (POI) located outside the displayed area is displayed on an edge of the displayed area towards a direction of the POI with respect to the displayed area. When the indicating object of the POI is selected, the displayed area of the electronic map is changed to the displayed area comprising the POI. Accordingly, users are able to quickly change the displayed area and check a location and related information of each POI in a simple operation manner.

16 Claims, 4 Drawing Sheets

(56) References Cited

U.S. PATENT DOCUMENTS

| | | | |
|---|---|---|---|
| 2003/0182052 A1 | 9/2003 | DeLorme et al. | |
| 2004/0204821 A1* | 10/2004 | Tu | 701/200 |
| 2004/0243306 A1* | 12/2004 | Han | 701/211 |
| 2007/0188408 A1 | 8/2007 | Jarczyk | |
| 2007/0229539 A1* | 10/2007 | Scott et al. | 345/629 |
| 2007/0256026 A1* | 11/2007 | Klassen et al. | 715/764 |
| 2009/0198767 A1* | 8/2009 | Jakobson et al. | 709/203 |
| 2009/0198768 A1* | 8/2009 | Gao et al. | 709/203 |
| 2009/0327078 A1* | 12/2009 | Ohazama et al. | 705/14.54 |

OTHER PUBLICATIONS

"1st Office Action of European counterpart application", issued on Nov. 16, 2009, p. 1-p. 4.

\* cited by examiner

METHOD AND APPARATUS FOR OPERATING DISPLAYED AREA OF ELECTRONIC MAP AND RECORDING MEDIUM

CROSS-REFERENCE TO RELATED APPLICATION

This application claims the priority benefit of Taiwan application serial no. 97133282, filed on Aug. 29, 2008. The entirety of the above-mentioned patent application is hereby incorporated by reference herein and made a part of specification.

BACKGROUND

Recently, with the continuous progress and development of electronic technology and communication technology, portable electronic devices occupying little space, for example, a cellular phone, a personal digital assistant (PDA) have been proposed. Almost all the portable electronic devices available on the market are integrated with various functions to improve the competitiveness thereof. In addition to the common photographing, calling, and internet browsing functions, a global positioning system (GPS) or other positioning systems, an electronic map, and a navigation system are further integrated in a current handheld communication apparatus. Accordingly, a user may obtain the self location through the positioning system at any time and any place, and finds out an optimal route through the planning and guiding of the navigation system to arrive at the destination.

The electronic map may be combined with the GPS or other positioning systems, such that the user can know a relative relation between the current location and the location of the destination. Specifically, the user First loads the electronic map into the electronic device, and then selects or inputs desired destinations or point of interests (POIs) through a touch screen, a keyboard, or other input devices of the electronic device, such that the electronic device displays the locations of the destinations or POIs on the electronic map.

However, since the size of the screen of the electronic device is limited, the electronic device usually can only display the electronic map on a suitable scale. Therefore, the electronic device can display only a certain area of the electronic map on the screen, for example, an area currently browsed by the user or an area around a certain POI. Under such a situation, if the user intends to check POIs dispersed outside the displayed area, many times of operations of zooming in, zooming out, map panning, map changing, and/or complicated menu selecting operations must be performed to show the POIs on the map, which is rather time-consuming and inconvenient. In addition, if the user intends to check the relative location among the POIs on the electronic map, the scale or the area of the electronic map must be adjusted to a suitable scale for displaying all the POIs on the same displayed area. The complicated operations are not only time-consuming, but also inconvenient for the user.

SUMMARY OF THE APPLICATION

Accordingly, the present application is directed to a method for operating a displayed area of an electronic map, in which an indicating object corresponding to a POI located outside the displayed area is displayed on an edge of the displayed area, so as to enable a user to check the relative location among the POIs in the same visual range and conveniently operate the displayed area of the electronic map.

The present application is also directed to an apparatus for operating a displayed area of an electronic map, in which an indicating object corresponding to a POI located outside the displayed area is displayed on an edge of the displayed area, so as to enable the user to quickly change the displayed area of the electronic map to the displayed area comprising the POI by selecting the indicating object thereof.

The present application is further directed to a recording medium, in which a computer program is stored for being loaded into and executed by an electronic device, so as to enable the user to check the relative location among POIs in the same visual range and conveniently operate a displayed area of an electronic map.

As embodied and broadly described herein, the present application provides a method for operating a displayed area of an electronic map. In the method, a displayed area of an electronic map is displayed first. Then, an indicating object of a first POI located outside the displayed area is displayed on an edge of the displayed area towards a first direction of the first POI with respect to the displayed area. When the indicating object of the first POI is selected, the displayed area of the electronic map is changed to the displayed area comprising the first POI.

In an example of the present application, the first direction of the first POI with respect to the displayed area is the direction of the first POI with respect to a central point of the displayed area.

In an example of the present application, the displayed area of the electronic map comprises a second POI. After the step of changing the displayed area of the electronic map to the displayed area comprising the first POI, the method further comprises displaying an indicating object of the second POI on an edge of the displayed area comprising the first POI towards a second direction of the second POI with respect to the first POI.

In an example of the present application, the step of changing the displayed area of the electronic map to the displayed area comprising the first POI is in a sliding or switching manner.

In an example of the present application, the step of changing the displayed area of the electronic map to the displayed area comprising the first POI comprises displaying the displayed area of the electronic map by taking the first POI as a center.

In an example of the present application, the step of changing the displayed area of the electronic map to the displayed area comprising the first POI comprises displaying the displayed area of the electronic map on the same scale.

In an example of the present application, the step of changing the displayed area of the electronic map to the displayed area comprising the first POI comprises displaying the displayed area of the electronic map on the same scale and taking the first POI as a center.

In an example of the present application, the step of changing the displayed area of the electronic map to the displayed area comprising the first POI comprises adjusting the scale of the displayed area of the electronic map, such that the changed displayed area comprises both of the first POI and the second POI.

The present application also provides an apparatus for operating a displayed area of an electronic map, which comprises an input unit, a storage unit, a display unit, and a processing unit. The input unit is used for receiving an input signal input by a user. The storage unit is used for storing an electronic map. The display unit is used for displaying a displayed area of the electronic map. The processing unit is coupled to the input unit, the storage unit, and the display unit. The processing unit displays an indicating object of a first POI located outside the displayed area on an edge of the displayed area towards a first direction of the first POI with respect to the displayed area, then determines whether the indicating object of the first POI is selected according to the input signal, and then changes the displayed area of the electronic map displayed by the display unit to the displayed area comprising the first POI when the indicating object of the first POI is selected.

In an example of the present application, the first direction of the first POI with respect to the displayed area is the direction of the first POI with respect to a central point of the displayed area.

In an example of the present application, the displayed area of the electronic map displayed by the display unit comprises a second POI.

In an example of the present application, the processing unit further displays an indicating object of the second POI on an edge of the displayed area comprising the first POI towards a second direction of the second POI with respect to the first POI.

In an example of the present application, the display unit changes the displayed area of the electronic map to the first POI in a sliding or switching manner.

In an example of the present application, the processing unit controls the display unit to display the displayed area of the electronic map on the same scale and take the first POI as a center.

In an example of the present application, the processing unit adjusts the scale of the displayed area of the electronic map, such that the changed displayed area displayed by the display unit comprises both of the first POI and the second POI.

In an example of the present application, the processing unit presents the indicating objects in a semitransparent or animation visual effect.

In an example of the present application, the indicating object comprises one of an indicating text, an indicating symbol, and an indicating icon, or a combination thereof. The indicating icon comprises an arrow pointing to the first direction, and the content of the indicating text comprises one of a name of the first POI and the distance between the first POI and a central point of the displayed area or the second POI, or a combination thereof.

The present application further provides a recording medium, which records a computer program to be loaded into an electronic device for executing the method for operating the displayed area of the electronic map described above. The computer program is basically consisted of a plurality of program code segments (for example, an organization chart establishing program code segment, a form signing program code segment, a setting program code segment, and a deployment program code segment). After the program code segments are loaded into the electronic device and are executed, the steps of the method for operating the displayed area of the electronic map and functions of the apparatus for operating the displayed area of the electronic map are executed.

In the present application, the indicating object of the POI located outside the displayed area is displayed on an edge of the displayed area towards the direction of the POI with respect to the displayed area, so as to indicate the relative location of the POI outside the displayed area, and the user is able to quickly change the displayed area of the electronic map to the POI outside the displayed area by selecting the indicating object, thereby enhancing the convenience for operating the displayed area of the electronic map.

In order to make the aforementioned and other objectives, features and advantages of the present application comprehensible, examples accompanied with figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION

Reference will now be made in detail to the present examples of the application, examples of which are illustrated in the accompanying drawings. Wherever possible, the same reference numbers are used in the drawings and the description to refer to the same or like parts.

In the present application, as for a POI located outside a displayed area, a direction of the POI with respect to the current displayed area is determined according to a relative location of each POI on an electronic map, and then an indicating object corresponding to the POI is displayed on an edge of the displayed area towards the direction of the POI. In an example, the indicating icon is displayed on an edge inside the displayed area. In another example, the indicating icon is displayed on an edge outside the displayed area, for example a frame outside the displayed area. A user is able to quickly change the displayed area to show the POI by selecting the indicating object. In order to make the content of the present application more comprehensible, examples are given below for proving that the present application can be implemented accordingly.

Figure 1:
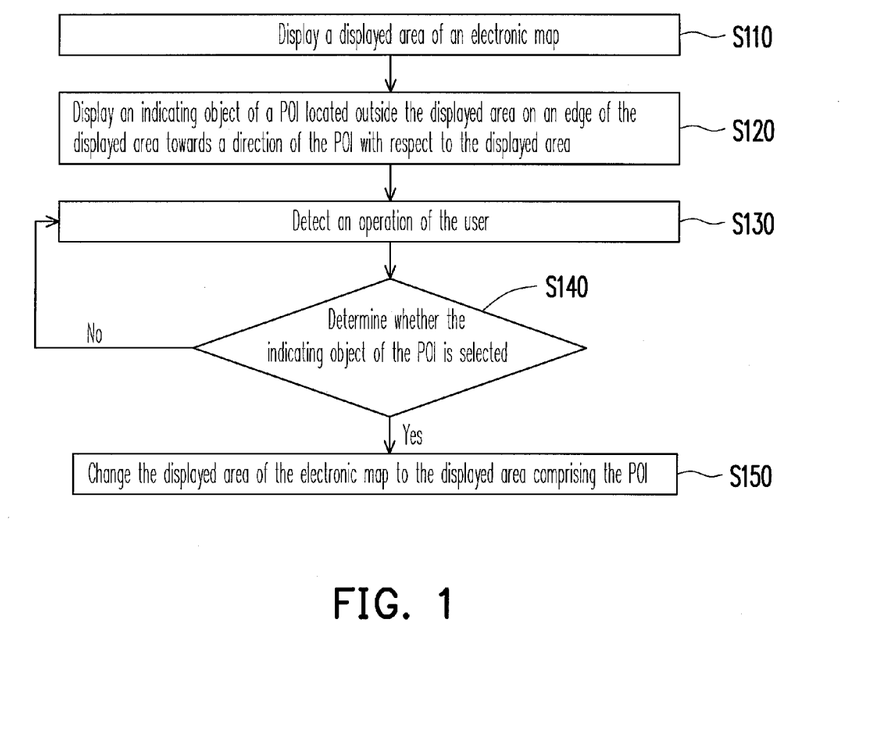
FIG. 1 is a flow chart of a method for operating a displayed area of an electronic map according to an example of the present application.

FIG. 1 is a flow chart of a method for operating a displayed area of an electronic map according to an example of the present application. Referring to FIG. 1, this example is applicable to a car PC, a desktop, a laptop, a cellular phone, a smartphone, a personal digital assistant (PDA), a PDA phone, a navigation device, a music player, a game device, or other electronic devices installed with an electronic map, so as to provide the user with an approach for quickly browsing the POI located outside the displayed area, and the detailed steps are given as follows.

First, a displayed area of an electronic map is displayed on a screen of an electronic device (Step S110). Due to the limited size of the screen, when displaying the electronic map, the electronic device usually can only display a certain part (i.e., the displayed area) of the electronic map.

Next, the electronic device further displays an indicating object of a POI located outside the displayed area on an edge of the displayed area towards a direction of the POI with respect to the current displayed area (Step S120). In an example, the user may set the POI to be browsed or viewed on the electronic map in a manner of inputting coordinates, operating a menu, or searching for a list, database, or website, and meanwhile, the POI may be a destination or a scenic spot to be visited by the user, or a restaurant, a gas station, a scenic spot, etc. close to the current location, which is not limited thereto.

In an example, by comparing the relative location between the POI and a central point of the current displayed area, the direction of the POI with respect to the current displayed area may be predicted. Then, the indicating object representing the POI is displayed on the edge of the current displayed area towards the predicted direction. The indicating object may be an arrow pointing to the POI or any other combination of an indicating text, an indicating symbol, and an indicating icon. For example, a name of the POI and a distance from the POI may be displayed in or around the displayed arrow pointing to the POI.

It should be noted that, if more than one interested POI exist outside the displayed area, the electronic device respectively displays the indicating objects of the POIs on the edges of the current displayed area towards the directions of the POIs in the same manner, wherein the amount of the POIs is not limited. In an example, the indicating object is presented in a semitransparent or animation visual effect. For example, if the indication object is displayed on the electronic map and the display range of the indicating object just overlaps a certain POI in the electronic map in the current displayed area, the indicating object may be presented in a semitransparent or animation visual effect and so that the indication object will not cover up the overlapped POI. Thus, the present application enables the user to observe the POI located outside the displayed area without affecting the user's capability of browsing the POIs in the displayed area by a visual interference of the indicating object.

Then, the electronic device detects an operation of the user (Step S130), so as to determines whether the indicating object of the POI is selected accordingly (Step S140). The user may select the indicating object by controlling a cursor on the screen through a mouse, an optical mouse, a keypad, a track ball, a joystick, a touch pad, a navigation key, a wheel, or a roller, etc.; select the indicating object by using a mouse, an optical mouse, a keypad, a track ball, a joystick, a touch pad, a navigation key, a wheel, or a roller, etc.; or select the indicating object by directly touching a touch screen, which is not limited thereto.

Finally, when the indicating object of the POI is selected, the electronic device automatically changes the current displayed area to the displayed area comprising the POI (Step S150). For the above manner of changing the displayed area, a sliding manner or a switching manner may be adopted to change the current displayed area to the POI, and the displayed area slid or switched to the POI is, for example, a displayed area displayed on the same scale by taking the POI as a center. By quickly sliding or switching the displayed area, the user may omit the complicated steps of zooming in, zooming out, and moving the map, so as to browse the location and the information of the POI in an extremely short time.

Figure 2:
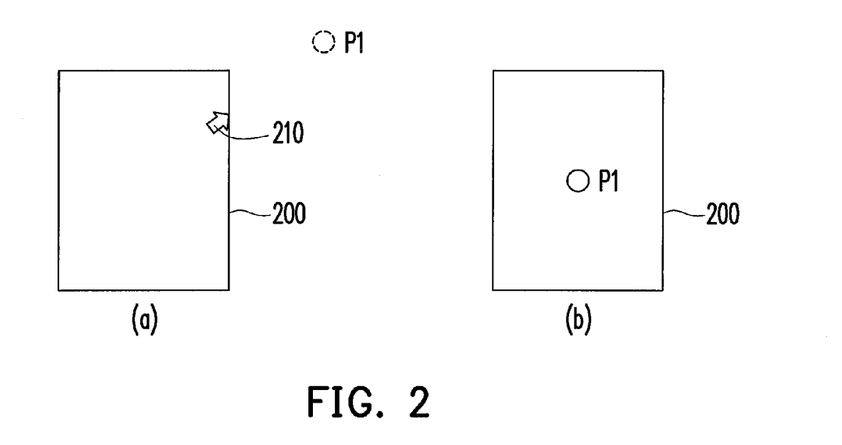
FIGS. 2(a) and 2(b) are schematic diagrams illustrating a method for operating a displayed area of an electronic map according to an example of the present application.

For example, FIGS. 2(a) and 2(b) are schematic diagrams illustrating a method for operating a displayed area of an electronic map according to an example of the present application. First, referring to FIG. 2(a), a displayed area 200 of an electronic map is, for example, a displayed area of the electronic map that is currently browsed by the user, wherein a visible range thereof is, for example, approximately 500 m and no POI is displayed within the visible range. A POI P1 falls, for example, at a location of 5 km away from the displayed area 200. In this case, the electronic device displays an indicating icon 210 on an edge of the displayed area 200 towards a direction of the POI P1 for the user to select. Next, referring to FIG. 2(b), when the indicating icon 210 is selected, the electronic device changes the displayed area 200 to a displayed area comprising the POI P1. In an example, the electronic device also displays the displayed area by taking the POI P1 as a center. Accordingly, the user can quickly change the displayed area by selecting the indicating icon 210, so as to check the location and the related information of the POI P1.

It should be noted that, in this example, the displayed area originally displayed by the electronic device is the displayed area of the electronic map currently browsed by the user, and does not comprise POIs. In another example, the displayed area of the electronic map originally displayed by the electronic device may also comprise POIs, or may be a displayed area displayed by taking the certain POI as a center. Under such a situation, when the displayed area of the electronic map is changed to a POI located outside the displayed area, an indicating object of the POI in the original displayed area is further displayed in the changed displayed area, such that the user can conveniently change back to the original displayed area comprising the POI. An example is given below for detailed description.

Figure 3:
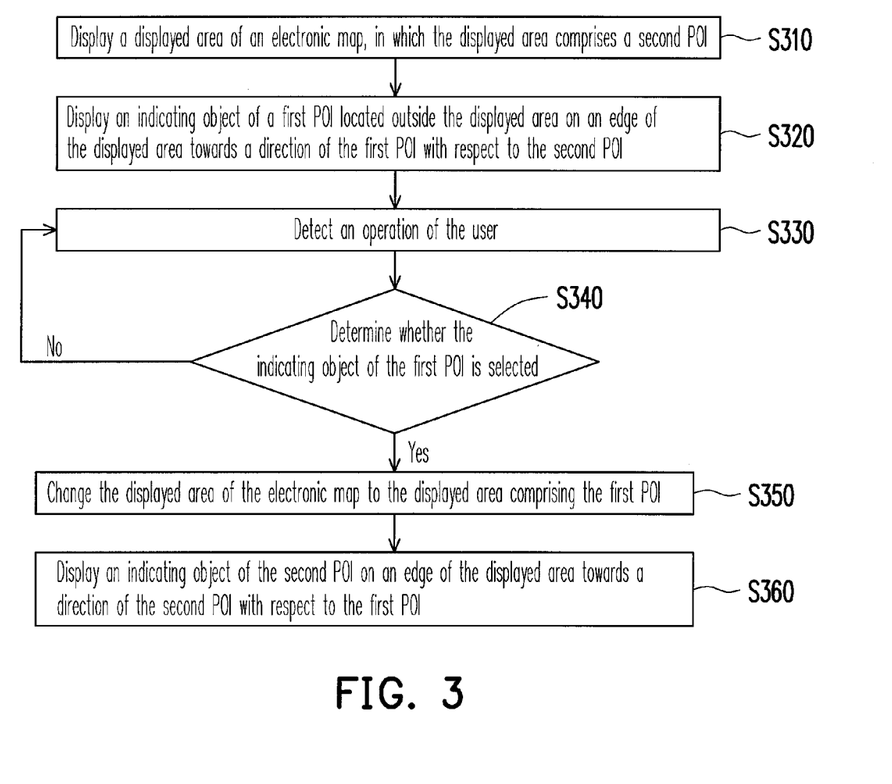
FIG. 3 is a flow chart of a method for operating a displayed area of an electronic map according to an example of the present application.

FIG. 3 is a flow chart of a method for operating a displayed area of an electronic map according to an example of the present application. Referring to FIG. 3, this example is applicable to a car PC, a desktop, a laptop, a cellular phone, a smartphone, a personal digital assistant (PDA), a PDA phone, a navigation device, a music player, a game device, or other electronic devices installed with an electronic map, so as to provide the user with an approach for quickly changing between a POI inside the displayed area and a POI outside the displayed area. Detailed steps thereof are given as follows.

First, a displayed area of an electronic map is displayed on a screen of an electronic device (Step S310). The displayed area comprises, for example, a second POI, and is displayed, for example, by taking the second POI as a center.

Next, the electronic device further displays an indicating object of a first POI located outside the displayed area on an edge of the displayed area towards a direction of the first POI with respect to the second POI (Step S320). Particularly, by comparing a relative location between the second POI and the first POI, the direction of the first POI with respect to the second POI may be predicted. Then, the indicating object representing the first POI is displayed on the edge of the current displayed area towards the predicted direction.

Then, the electronic device detects an operation of the user (Step S330), so as to determine whether the indicating object of the POI is selected (Step S340). When the indicating object of the first POI is selected, the electronic device automatically changes the displayed area of the electronic map to the displayed area comprising the first POI (Step S350). The displayed area comprising the first POI is, for example, a displayed area displayed by taking the first POI as a center and displayed on the same scale as the original displayed area.

At this time, the electronic device further displays an indicating object of the second POI on an edge of the changed displayed area towards a direction of the second POI with respect to the first POI (Step S360). Accordingly, the user may change the displayed area back to the original displayed area by selecting the indicating object of the second POI, and the manner of changing the displayed area by selecting the indicating object is the same as that of the above manner, so it is not repeated herein.

Figure 4:
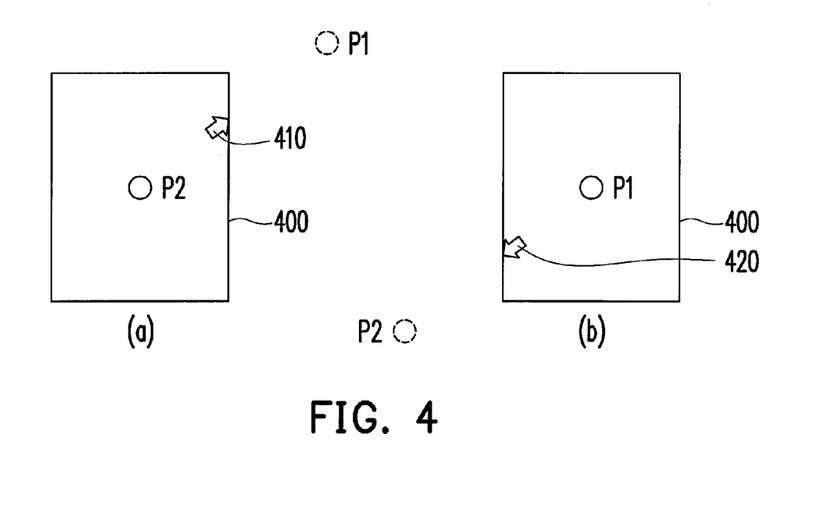
FIGS. 4(a) and 4(b) are schematic diagrams illustrating a method for operating a displayed area of an electronic map according to an example of the present application.

For example, FIGS. 4(a) and 4(b) are schematic diagrams illustrating a method for operating a displayed area of an electronic map according to an example of the present application. First, referring to FIG. 4(a), a displayed area 400 of an electronic map is, for example, a displayed area of the electronic map that is currently browsed by the user, wherein a visible range thereof is, for example, approximately 500 m and a POI P2 is displayed within the visible range. A POI P1 falls, for example, at a location of 5 km away from the displayed area 400. In this case, the electronic device displays an indicating icon 410 of the POI P1 on an edge of the displayed area 400 towards a direction of the POI P1, such that the user may select the indicating icon 410. Next, referring to FIG. 4(b), when the indicating icon 410 is selected, the electronic device changes the displayed area 400 to the displayed area of the POI P1. In an example, the electronic device also displays the displayed area by taking the POI P1 as a center. In addition, the electronic device further displays an indicating icon 420 of the P2 on an edge of the displayed area 400 towards a direction of the POI P2 for the user to select. Accordingly, the user can quickly change the displayed area between the POI P2 and the POI P1 by selecting the indicating icon 410 and the indicating icon 420 respectively, so as to check the locations and the related information of the POI P1 and the POI P2.

In addition, in an example of the present application, the user may also need to check a relative location between two POIs, so as to plan a traveling route there-between. In this case, the scale of the displayed area needs to be adjusted, so that the two POIs can be accommodated in the same visible range, so as to enable the user to clearly know the relative location. An example is given below for detailed description.

Figure 5:
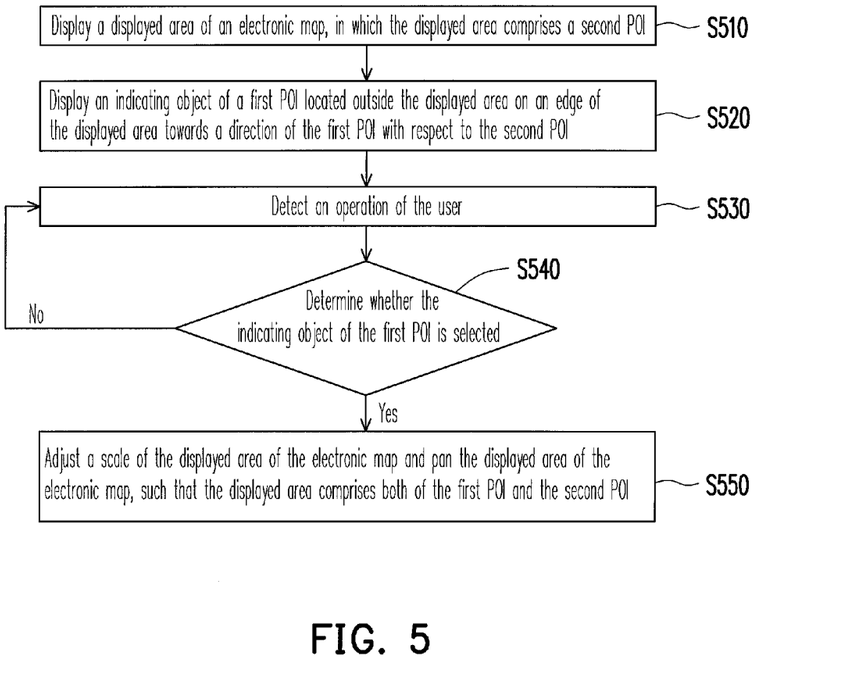
FIG. 5 is a flow chart of a method for operating a displayed area of an electronic map according to an example of the present application.

FIG. 5 is a flow chart of a method for operating a displayed area of an electronic map according to an example of the present application. Referring to FIG. 5, this example is applicable to a car PC, a desktop, a laptop, a cellular phone, a smartphone, a personal digital assistant (PDA), a PDA phone, a navigation device, a music player, a game device, or other electronic devices installed with an electronic map, so as to provide the user with an approach for checking location information and other information of more than two POIs within the same displayed area range. Detailed steps are given as follows.

First, a displayed area of an electronic map is displayed on a screen of an electronic device (Step S510). The displayed area comprises, for example, a second POI, and is displayed, for example, by taking the second POI as a center.

Next, the electronic device further displays an indicating object of a first POI located outside the displayed area on an edge of the displayed area towards a direction of the first POI with respect to the second POI (Step S520).

Then, the electronic device detects an operation of the user (Step S530), so as to determine whether the indicating object of the first POI is selected (Step S540). When the indicating object of the first POI is selected, the electronic device automatically adjusts the scale of the displayed area of the electronic map, so as to enable the changed displayed area to comprise both of the first POI and the second POI (Step S550). Accordingly, by selecting the indicating object of the first POI, the user can properly enlarge the displayed area to a range including the two POIs, so as to omit the complicated adjusting steps.

Figure 6:
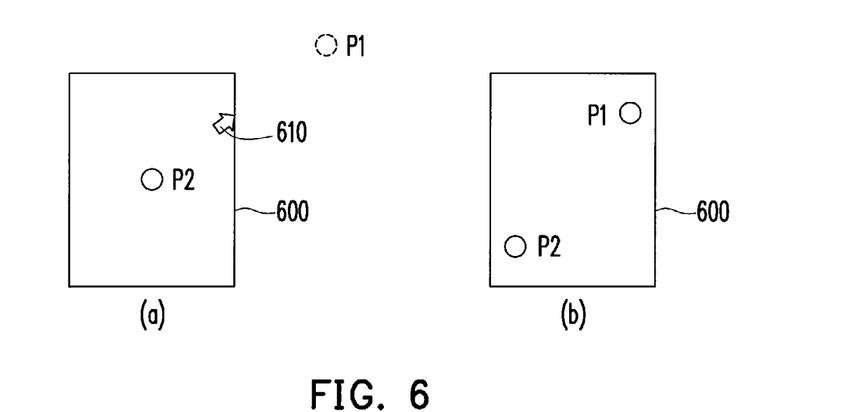
FIGS. 6(a) and 6(b) are schematic diagrams illustrating a method for operating a displayed area of an electronic map according to an example of the present application.

For example, FIGS. 6(a) and 6(b) are schematic diagrams illustrating a method for operating a displayed area of an electronic map according to an example of the present application. First, referring to FIG. 6(a), a displayed area 600 of an electronic map is, for example, a displayed area of the electronic map that is currently browsed by the user, wherein a visible range thereof is, for example, approximately 500 m and a POI P2 is displayed within the visible range. A POI P1, for example, falls at a location of 5 km away from the displayed area 600. In this case, the electronic device displays an indicating icon 610 of the POI P1 on an edge of the displayed area 600 towards a direction of the POI P1 for the user to select. Next, referring to FIG. 6(b), when the indicating icon 610 is selected, the electronic device automatically adjusts the scale of the displayed area 600, such that the changed displayed area 600 comprises both of the POI P1 and the POI P2. Accordingly, by selecting the indicating icon 610, the user can adjust the range of the displayed area, and check the relative location between the POI P1 and the POI P2.

It should be noted that, in the above examples, two POIs are set as an example for description, but it is not limited thereto. According to the practical demands, those skilled in the art may expand the present application to the applications for more than two POIs. For example, a plurality of POIs are displayed inside the displayed area, or the indicating objects of a plurality of POIs outside the displayed area are displayed on the edges of the displayed area, such that the user may check the locations and the related information of different POIs. In an example, the indicating object is presented in a semitransparent or animation visual effect. For example, under the situation of displaying a plurality of POIs inside the displayed area, in order to prevent the displayed indicating objects from covering up the POIs inside the displayed area, the indicating objects are presented in a semitransparent or animation visual effect.

Figure 7:
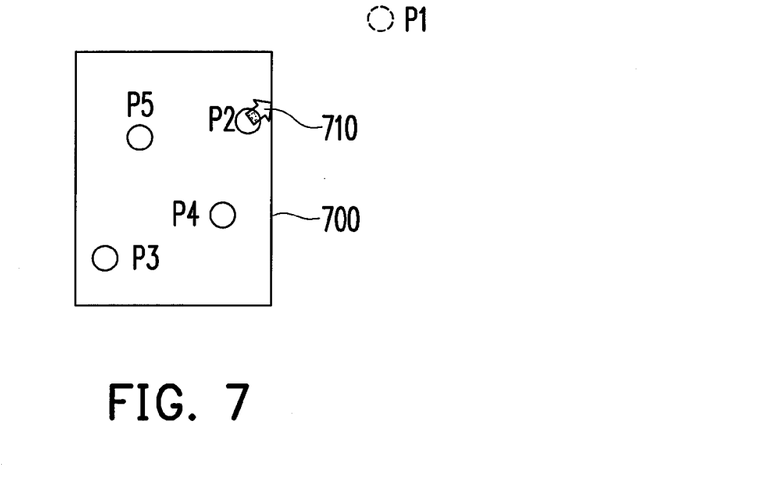
FIG. 7 shows an example of a method for operating a displayed area of an electronic map according to an example of the present application.

For example, FIG. 7 shows an example of a method for operating a displayed area of an electronic map according to an example of the present application. Referring to FIG. 7, a displayed area 700 of an electronic map comprises POIs P2, P3, P4, and P5. A POI P1, for example, falls at a location of 5 km away from the displayed area 700. In this case, the electronic device displays an indicating icon 710 of the POI P1 on an edge of the displayed area 700 towards a direction of the POI P1, wherein because the location of the indicating icon 710 just overlaps the POI P2, the indicating icon 710 is presented in a semitransparent manner in this example, so as to avoid covering up the POI P2.

Corresponding to the above operating methods, an operating apparatus is provided in the present application, which may be applied to car PC, a desktop, a laptop, a cellular phone, a smartphone, a personal digital assistant (PDA), a PDA phone, a navigation device, a music player, a game device, or other electronic devices, so as to enable the user of the apparatus to quickly browse the locations and the related information of POIs. An example is given below for detailed description.

Figure 8:
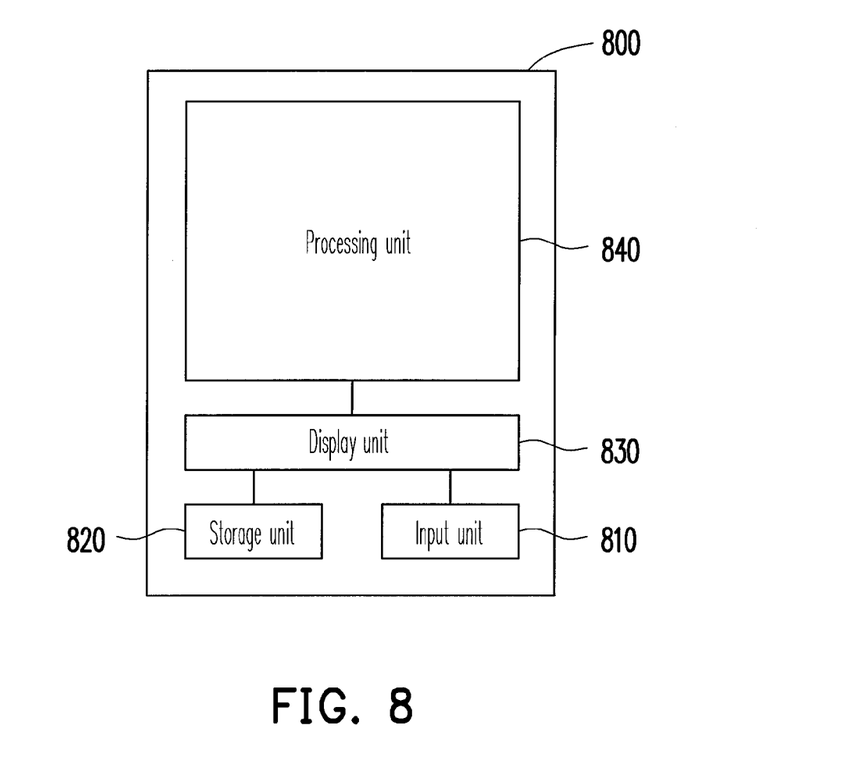
FIG. 8 is a block diagram of an apparatus for operating a displayed area of an electronic map according to an example of the present application.

FIG. 8 is a block diagram of an apparatus for operating a displayed area of an electronic map according to an example of the present application. Referring to FIG. 8, an operating apparatus 800 is applicable to car PC, a desktop, a laptop, a cellular phone, a smartphone, a personal digital assistant (PDA), a PDA phone, a navigation device, a music player, a game device, or other electronic devices installed with an electronic map, such that the user can quickly change the displayed area of the electronic map, so as to browse a location and related information of a POI outside the displayed area. The operating apparatus 800 comprises an input unit 810, a storage unit 820, a display unit 830, and a processing unit 840, and the functions thereof are respectively described as follows.

The input unit 810 is, for example, a mouse, a keyboard, or another input device connected to a computer, or a touch screen, a touch pad, a mouse, a optical mouse, a keypad, a track ball, a joystick, a touch pad, a navigation key, a wheel, or a roller disposed on an electronic device, which generates a corresponding input signal according to an operation of the user.

The storage unit 820 is, for example, a hard disk, a memory, a flash memory, a storage card, or another storage medium, and is used for storing an electronic map. In an example, the electronic map may be downloaded from an internet database and stored in the storage unit 820 when the user browses the electronic map. The display unit 830 is, for example, a liquid crystal display (LCD), and is used for displaying the electronic map.

The processing unit 840 is coupled to the input unit 810, the storage unit 820, and the display unit 830. In addition to display an indicating object of a POI located outside the displayed area according to a relative location between the POI and the displayed area, the processing unit 840 further quickly changes the displayed area of the electronic map to the displayed area comprising the POI when the indicating object of the POI is selected.

Particularly, as for the POI located outside the displayed area, the processing unit 840 first determines a direction of the POI with respect to the displayed area, and displays the indicating object of the POI on an edge of the displayed area displayed by the display unit 830 towards the determined direction. In addition, the processing unit 840 further changes the displayed area displayed by the display unit 830 to the displayed area comprising the POI in a sliding or a switching manner when the indicating object of the POI is selected.

In addition, when the displayed area is slid or switched to the POI, the processing unit 840 further displays an indicating object of the POI in the original displayed area on an edge of the changed displayed area towards a direction of the POI, so as to provide the user with an approach for returning to the original displayed area. Accordingly, the user can quickly change the displayed area of the electronic map by operating the apparatus 800, so as to browse the locations and the related information of different POIs.

It should be noted that, in another example, when the user intends to check relative locations among more than two POIs at the same time, the processing unit 840 suitably adjusts the scale of the displayed area and changes the displayed area of the electronic map when the user clicks the indicating object, so as to display all the POIs in the same visual range. The implementation manner has been described in detail in the above examples, so the description thereof is not repeated herein.

The present application further provides a recording medium, which records a computer program to be loaded into an electronic device to execute aforesaid method for operating the displayed area of the electronic map. The computer program is basically consisted of a plurality of program code segments (for example, an organization chart establishing program code segment, a form signing program code segment, a setting program code segment, and a deployment program code segment). After the program code segments are loaded into an electronic device and are executed, the steps of the method for operating the displayed area of the electronic map and the functions of the apparatus for operating the displayed area of the electronic map are achieved.

To sum up, in the method and the apparatus for operating the displayed area of the electronic map and the recording medium, the indicating objects corresponding to the POIs located outside the displayed area are displayed on the edge of the displayed area of the electronic map towards the direction of the POIs, such that the user can easily and clearly know the relative locations of different POIs. In addition, the user is able to quickly change the displayed area to the POIs outside the original displayed area by selecting the corresponding indicating objects, so as to browse the locations and the related information of different POIs, thereby enhancing the convenience for operating the displayed area of the electronic map.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. An apparatus for operating a displayed area of an electronic map, comprising:
   an input unit, for receiving an input signal;
   a storage unit, for storing an electronic map;
   a display unit, for displaying a displayed area of the electronic map; and
   a processing unit, coupled to the input unit, the storage unit, and the display unit, and is configured for displaying a first map area of an electronic map on a touch screen;
   displaying a first point of interest (POI) within the first map area;
   displaying on a first edge of the first map area a first indicating object pointing at a first to a second POI which is located outside the first map area and also on a second edge of the first map area a second indicating object pointing to a third POI which is located outside the first map area, wherein the first edge could be the same edge as the second edge;
   in direct response to receiving a first touch signal on the first indicating object, directly shifting the displayed area of the electronic map to display the second POI in the center of a second map area in the same scale as the first map area and displaying a third indicating object pointing to the first POI on an edge which is opposite to the first edge of the first map area;
   after receiving the first touch signal and the displayed area is shifted to the second map area, in direct response to receiving a second touch signal on the third indicating object, directly shifting the displayed area of the electronic map to display the first POI in the center of a third map area in the same scale as the first map area, displaying a fourth indicating object pointing to the second POI which is located outside the third map area and displaying a fifth indicating object pointing to the third POI which is located outside the third map area;
   in direct response to receiving a third touch signal on the fifth indicating object, directly shifting the displayed area of the electronic map to display the third POI in the center of a fourth map area in the same scale as the first map area and displaying a six indicating object pointing to the first POI on an edge which is opposite to the first edge of the first map area; and after receiving the third touch signal and the displayed area is shifted to the fourth map area, in direct response to receiving a fourth touch signal on the six indicating object, directly shifting the displayed area of the electronic map to display the first POI in the center of the third map area in the same scale as the first map area.

2. The apparatus according to claim 1, wherein the display unit changes the displayed area of the electronic map to the second displayed area in a sliding manner.

3. The apparatus according to claim 1, wherein the indicating object comprises one of an indicating text, an indicating symbol, and an indicating icon, or a combination thereof.

4. The apparatus according to claim 3, wherein content of the indicating text comprises one of a name of the first POI and a distance between the first POI and the second POI, or a combination thereof.

5. The apparatus according to claim 1 wherein the processing unit further control the display unit to display a fourth POI, wherein when the fourth POI overlaps with the first indicating object, the first indicating object is presented in a semitransparent or effect.

6. The apparatus according to claim 1, wherein the display unit changes the displayed area of the electronic map to the second displayed area in a switching manner.

7. The apparatus according to claim 1, wherein the processing unit further control the display unit to display a fourth POI, wherein when the fourth POI overlaps with the first indicating object, the first indicating object is presented in an animation visual effect.

8. The apparatus according to claim 1, wherein the processing unit further used for zooming out the displayed area so that the displayed area displays the first POI, the second POI, and the third POI in the same displayed area.

9. A method for operating a displayed area of an electronic map with point of interests located outside of the displayed area, and the method comprising:

displaying a first map area of an electronic map on a touch screen;

displaying a first point of interest (POI) within the first map area;

displaying on a first edge of the first map area a first indicating object pointing at a first to a second POI which is located outside the first map area and also on a second edge of the first map area a second indicating object pointing to a third POI which is located outside the first map area, wherein the first edge could be the same edge as the second edge;

in direct response to receiving a first touch signal on the first indicating object, directly shifting the displayed area of the electronic map to display the second POI in the center of a second map area in the same scale as the first map area and displaying a third indicating object pointing to the first POI on an edge which is opposite to the first edge of the first map area;

after receiving the first touch signal and the displayed area is shifted to the second map area, in direct response to receiving a second touch signal on the third indicating object, directly shifting the displayed area of the electronic map to display the first POI in the center of a third map area in the same scale as the first map area, displaying a fourth indicating object pointing to the second POI which is located outside the third map area and displaying a fifth indicating object pointing to the third POI which is located outside the third map area;

in direct response to receiving a third touch signal on the fifth indicating object, directly shifting the displayed area of the electronic map to display the third POI in the center of a fourth map area in the same scale as the first map area and displaying a six indicating object pointing to the first POI on an edge which is opposite to the first edge of the first map area; and after receiving the third touch signal and the displayed area is shifted to the fourth map area, in direct response to receiving a fourth touch signal on the six indicating object, directly shifting the display area of the electronic map to display the first POI in the center of the third map area in the same scale as the first map area.

10. The method according to claim 9, wherein changing the displayed area of the electronic map is in a sliding manner.

11. The method according to claim 9, wherein the indicating object comprises one of an indicating text, an indicating symbol, and an indicating icon, or a combination thereof.

12. The method according to claim 9, wherein the first displayed area of the electronic map further comprises a fourth POI, wherein when the fourth POI overlaps with the first indicating object, the first indicating object is presented in a semitransparent effect.

13. The method according to claim 9, wherein changing the displayed area of the electronic map is in a switching manner.

14. The method according to claim 9, wherein changing the displayed area of the electronic map further comprises a fourth POI, wherein when the fourth POI overlaps with the first indicating object, the first indicating object is presented in an animation visual effect.

15. The method according to claim 9, further comprising:
zooming out the displayed area so that the displayed area displays the first POI, the second POI, and the third POI in the same displayed area.

16. A non-transitory recording medium, which stores computer readable codes configured to execute the method for operating the displayed area of the electronic map according to claim 9 via an electronic device.

* * * * *